United States Patent [19]

Kaneko et al.

[11] Patent Number: 4,952,231
[45] Date of Patent: Aug. 28, 1990

[54] PROCESS FOR TREATING PRODUCT OF RADIATION TREATMENT OF AMMONIA-ADDED EFFLUENT GAS

[75] Inventors: Mitsuyoshi Kaneko; Ryoji Suzuki; Shinji Aoki, all of Tokyo, Japan

[73] Assignee: Ebara Corporation, Tokyo, Japan

[21] Appl. No.: 349,082

[22] Filed: May 9, 1989

Related U.S. Application Data

[63] Continuation of Ser. No. 123,396, Nov. 20, 1987, abandoned.

[30] Foreign Application Priority Data

Nov. 26, 1986 [JP] Japan .................. 61-279791
Jun. 29, 1987 [JP] Japan .................. 62-159708

[51] Int. Cl.$^5$ .......................... C05C 1/00; C05C 1/02; C05C 11/00
[52] U.S. Cl. ...................................... 71/59; 71/60; 423/376; 423/235 D; 204/157.3; 204/157.77
[58] Field of Search ............... 71/59, 60; 423/351, 423/396; 204/157.3, 157.44, 157.77

[56] References Cited

U.S. PATENT DOCUMENTS 3,869,362  3/1975  Machi et al. ............ 204/157.1 R
3,981,815  9/1976  Taniguchi et al. ............ 252/182

FOREIGN PATENT DOCUMENTS 48-17471  3/1973  Japan .
49-95866  9/1974  Japan .
50-57947  5/1975  Japan .
52-105565  9/1977  Japan .
52-105566  9/1977  Japan .
52-105567  9/1977  Japan .
53-22115  3/1978  Japan .
53-22155  3/1978  Japan .
53-22156  3/1978  Japan .
53-67678  6/1978  Japan .
53-67680  6/1978  Japan .
53-67681  6/1978  Japan .
51-93796  8/1986  Japan .
63-104635  5/1988  Japan .

OTHER PUBLICATIONS

CA 104(10):71150a, "Sulfur ... Smoke", Frank et al., 1985.
CA 94(6):35642d, "Treatment ... beams", Nippon, 1980.
CA 89(24):203434e, "Treatment ... oxides", Sawada, 1978.
CA 88(26):196884a, "Ammonium ... beam", Kimura, 1977.
CA 73(2):9387w, "Radiation ... systems", Kersulis et al., 1970.
Chemical Engineering Progress, vol. 81, No. 6, Jun. 1985, pp. 30–36, New York, U.S.; N. W. Frank et al., "SO2/NOx: a natural resource should not go up in smoke".
Chemical Abstracts, vol. 98, 1983, p. 664, abstract No. 136597f, Columbus OH, U.S.: I. K. Thege: "DSC investigation of the thermal behavior of (NH4)2SO4, NH4HSO4 and ammonium sulfamate (NH4NH2SO3)", & Thermochin. Acta 1983, 60(2), 149–159.

Primary Examiner—Ferris H. Lander
Attorney, Agent, or Firm—Oblon, Spivak, McClelland, Maier & Neustadt

[57] ABSTRACT

A solid product which comprises ammonium sulfate and ammonium nitrate and which contains a sulfamic acid compound is produced when an effluent gas having ammonia added thereto is irradiated with a radiation to thereby desulfurize and denitrate the effluent gas comprising $SO_x$, $NO_x$ and CO, but the CO gas content being less than ten times the concentration of $SO_x$. It is possible to remove the noxious sulfamic acid compound from the above-described product while preventing decomposition of the ammonium nitrate in the product which is useful as a fertilizer ingredient by heating the product at a temperature of from 130° C. to 250° C., particularly from 180° C. to 250° C.

13 Claims, 5 Drawing Sheets

Fig. 1

Fig. 4 FLOW OF RECIRCULATING GAS GENERATED BY HEAT TREATMENT SO AS TO BE MIXED WITH EFFLUENT GAS TO BE TREATED

Fig. 5  FLOW OF UTILIZING HEAT OF EFFLUENT GAS AS HEAT SOURCE

PROCESS FOR TREATING PRODUCT OF RADIATION TREATMENT OF AMMONIA-ADDED EFFLUENT GAS

This application is a continuation of application Ser. No. 07/123,396, filed on Nov. 20, 1987, now abandoned.

Background of the Invention

The present invention relates to a process for treating a solid product which is produced when a combustion gas having ammonia added thereto is irradiated with a radiation to thereby desulfurize and denitrate the combustion gas, the product consisting essentially of ammonium sulfate, ammonium nitrate and a composite thereof and containing a sulfamic acid compound. More particularly, the present invention pertains to a process for removing the noxious sulfamic acid compound from the above-described product a heat treatment while preventing decomposition of the ammonium nitrate in the by-product which is useful as a fertilizer ingredient.

It has heretofore been known that, when a combustion gas which contains sulfur oxides ($SO_x$) and/or nitrogen oxides ($NO_x$) and which has ammonia added thereto is irradiated with a radiation, a solid product consisting essentially of $(NH_4)_2SO_4$, $NH_4HO_3$, $(HN_4)_2SO_4 \cdot 2NH_4NO_3$ and $(NH_4)_2SO_4 \cdot 3NH_4NO_3$ is obtained and that, heating this by-product at 100 to 350° C., ammonium nitrate ($NH_4NO_3$) which is hygroscopic is decomposed into $N_2O$, $N_2$, $O_2$ and $H_2O$ and also relatively pure ammonium sulfate [$(NH_4)_2SO_4$] is produced which allows it to be used as a fertilizer [see the specification of Japanese Patent Public Disclosure (Laid-Open) No. 52-105565 (105565/1977)].

The above-described process still has some room for improvement in regard to the disadvantage that ammonium nitrate, which is useful as a fertilizer ingredient, is decomposed. The prior art process is usually carried out by adding an amount of ammonia which is 0.25 to 2 times the amount of sulfur oxides and nitrogen oxides in terms of molar ratio and then irradiating the mixture with a radiation of 0.3 to 3.0 Mrad.

The above-described process (hereinafter referred to as "EBA process") wherein ammonia is added to a combustion gas and the mixture is irradiated with radiation to thereby remove sulfur oxides and nitrogen oxides from the exhaust gas has been practiced in experimental plants and plants close to practical use since 1971, and it was not questioned before the middle of 1985 whether or not the product of the EBA process contains a sulfamic acid compound.

However, analysis of the product produced in an experiment recently carried out has revealed that the by-product contains several % of a sulfamic acid compound.

The present inventors conducted various studies about the cause of the formation of this sulfamic acid compound. Although various causes for the formation of the sulfamic acid compound were expected to be found, when the present inventors examined the composition of the effluent gas which has heretofore been used in the EBA process and the composition of the gas used in the experimental process carried out at this time, it was found that substantially no CO gas was contained in the gas used in the experimental process, whereas a large amount (5000 ppm or more) of CO gas was contained in the effluent gas conventionally used. The inventors filed an application with regard to preventing the formation of a sulfamic acid compound by means of adding CO gas as Japanese Patent Application No. 61-249889 (249889/1986).

Then, CO gas was added to the gas used in the experimental process and the gas mixture was subjected to the EBA process. As a result, it was found that no sulfamic acid compound is produced when the CO gas content is ten times or more the concentration of sulfur oxides.

The content of sulfamic acid compounds in a fertilizer is regulated so as to be 0.01% or less with respect to 1% of the nitrogen contained in the fertilizer under the Fertilizer Control Act because sulfamic acid compounds are harmful to plants. Under these circumstances, since the nitrogen content in the product produced when an effluent gas containing no CO gas is treated in accordance with the EBA process is usually about 20%, it is necessary if this product is to be used as a fertilizer to reduce the content of the sulfamic acid compound in the product to 0.2% or less of the whole weight of the product.

SUMMARY OF THE INVENTION

Accordingly, it is a primary object of the present invention to provide a process for removing a sulfamic acid compound from a product which is produced when an effluent gas is subjected to the EBA process and, at the same time, efficiently collecting a fertilizer containing no sulfamic acid compound.

To this end, the present invention provides a process wherein a product which is produced when an effluent gas having ammonia added thereto is irradiated with radiation to thereby desulfurize and denitrate the effluent gas is heated at a temperature of from 130 to 250° C., particularly from 180 to 250° C., thereby removing a sulfamic acid compound from the product.

The present inventors found that a relatively small amount of a sulfamic acid compound is contained in a solid product which is produced when a combustion gas containing a relatively small amount of CO gas is treated by the EBA process, and made exhaustive studies in order to find a process for removing the sulfamic acid compound from the product. As a result, the present inventors have found that it is possible to remove the sulfamic acid compound by heating the product at a temperature of from 130 to 250° C., particularly from 180 to 250° C., for a relatively short period of time. The present invention has been accomplished on the basis of this finding.

The present inventors have also found that the sulfamic acid compound contained in the product is decomposed through the reaction of 1 mole of said compound with 1 mole of ammonium nitrate contained in the product and, within the above-described temperature range, no ammonium nitrate is unnecessarily decomposed while the sulfamic acid compound is being decomposed.

DETAILED DESCRIPTION OF THE INVENTION

The present invention will be described hereinunder in detail.

In the case where the EBA process is applied to an effluent gas, in the present invention the amount of ammonia which is to be added to the effluent gas is preferably selected so that the ammonia content in the resulting mixture is 0.25 to 2.0 times the respective contents of sulfur oxides and nitrogen oxides in terms of molar ratio, and an adequate radiation dose is 0.3 to 3.0 Mrad, in the same way as in the ordinary EBA process.

Examples of kinds of radiations which may be employed in the present invention include alpha-ray, beta-ray, gamma-ray, X-rays, electron beam, neutron rays, etc. Among these forms of radiation, electron beam may conveniently be used.

The temperature of the effluent gas when irradiated with radiation may be within the range from 50 to 150° C. Usually, the gas is irradiated at a temperature of from 50 to 90° C. because in this temperature range the rate at which sulfur oxides and nitrogen oxides are removed is maximized.

It is preferable to mix ammonia with the effluent gas before the irradiation, but the mixing may also be carried out during the irradiation.

It is conjectured from various kinds of basic experimental data and the like that the mechanism of formation of ammonium sulfate, ammonium nitrate and the sulfamic acid compound by the EBA process proceeds from the action of OH, O and HO$_2$, radicals produced by the irradiation. The formation of ammonium sulfate, ammonium nitrate and the sulfamic acid compound may be expressed as follows:

Formation of $(NH_4)_2SO_4$ (1)

$O_2, H_2O \longrightarrow OH, O, HO_2$

(2)

$SO_2 + 2OH \longrightarrow H_2SO_4$

(3)

$H_2SO_4 + 2NH_3 \longrightarrow (NH_4)_2SO_4$

Formation of $NH_4NO_3$

(4)

$NO + HO_2 \longrightarrow HNO_3$

(5)

$HNO_3 + NH_3 \longrightarrow NH_4NO_3$

Formation of $NH_2SO_3NH_4$ (6)

$SO_2 + OH \longrightarrow SO_3H$ (7)

$SO_3H + NH_3 \longrightarrow SO_3NH_4$ (8)

$NH_3 + OH \longrightarrow NH_2 + H_2O$ (9)

$SO_3NH_4 + NH_2 \longrightarrow NH_2SO_3NH_4$

It is understood that the formation of the sulfamic acid compound ($NH_2SO_3NH_4$) is suppressed by the presence of CO.

It will be understood from the above-described formulae that the contents of ammonium nitrate ($NH_4NO_3$) and sulfamic acid compound ($NH_2SO_3NH_4$) in the product depend on the concentrations of sulfur oxides and nitrogen oxides in the treated gas and when the nitrogen oxide concentration is particularly low, the molar ratio of ammonium nitrate with respect to the sulfamic acid compound may be 1 or less. In such a case, it is necessary to add ammonium nitrate so that the product is in the presence of a molar amount of ammoniumnitrate which is sufficient to reduce the amount of the sulfonic acid compound to a predetermined level, e.g. 0.2% or less of the whole weight of the product.

The product obtained by the EBA process is heated, according to the present invention, at a temperature of from 130 to 250° C., preferably from 180 to 250° C. to thereby decompose the sulfamic acid compound contained in the product.

The heating time depends on the heating temperature. Adequate heating times are as follows: about 30 minutes at 180° C.; about 15 minutes at 200° C.; and about 10 minutes at 250° C. In the case where the heating temperature exceeds 250° C., ammonium nitrate is unnecessarily decomposed, that is, ammonium nitrate is unfavorably decomposed more than an amount equimolar with the sulfamic acid compound. In addition, even if the heating temperature is raised higher than 250° C., the time required to decompose the sulfamic acid compound is not shortened correspondingly. Therefore, a heating temperature in excess of 250° C. is unfavorable.

It should be noted that the above-described heating may be carried out in a granulating apparatus such as a crusher type granulator or an extrusion type granulator to thereby simultaneously effect the decomposition of the sulfamic acid compound and the granulation of the remaining fertilizer ingredients.

The following Examples are provided for the purpose of further illustrating the present invention but are not to be construed as limiting.

EXAMPLE 1

A combustion gas containing sulfur oxides (900 ppm), nitrogen oxides (150 ppm) and carbon monoxide (120 ppm) and having a temperature of 200° C. was cooled down to 70° C. and ammonia gas was added to the gas so that the ammonia content reached 1,950 ppm (1 mole equivalent) by volume. Then, the mixture was passed through the reactor at a rate of about 900 Nm$^3$/hour, and the solid product formed through the reaction was collected using an electrostatic precipitator. The product was obtained at a rate of 5 kg/hour. The contents of sulfur oxides and nitrogen oxides in the effluent gas having the product collected therefrom were 45 ppm and 18 ppm, respectively.

It should be noted that the effluent gas in the reactor was irradiated with electron beam of 1.8 Mrad.

The results of analysis of the product thus obtained are shown in Table 1 below.

TABLE 1
Analysis of By-Product

| Compound (formula) | Results of analysis (wt. %) |
| --- | --- |
| Sulfuric acid ion ($SO_4^{2-}$) | 58.5 |
| Nitric acid ion ($NO_3^-$) | 6.6 |
| Ammonium ion ($NH_4^+$) | 25.8 |
| Sulfamic acid compound ($NH_2SO_3H$) | 5.0 |
| Insoluble matter, etc. | 4.1 |
| Total | 100.0 |

EXAMPLE 2

The product obtained in Example 1 was heated at each of the following various temperatures, that is, 100°, 130° C., 150° C., 180° C., 200° C., 250° C. and 300° C., to obtain the relationship between the heating temperature and the time required to decompose the sulfamic acid compound for each of the above-described temperatures. The results are shown in FIG. 1.

The relationship between the concentration of nitric acid ions remaining in the by-product and the heating time for each of the heating temperatures, that is, 180° C., 200° C., 250° C. and 300° C., was also examined. The results are shown in FIG. 2.

Figure 1:
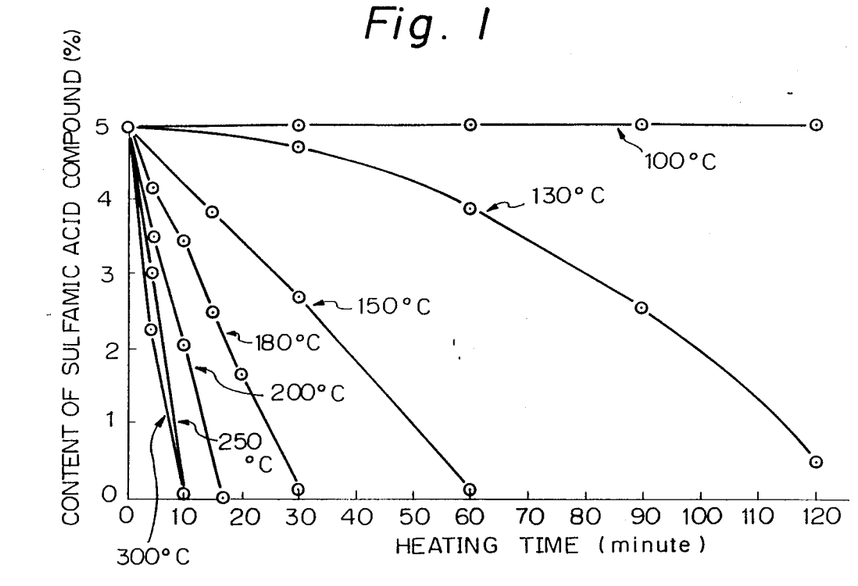
FIG. 1 is a graph showing the relationship between the heating time and the content of the sulfamic acid compound at specific temperatures.

The results shown in FIG. 1 revealed that it is necessary in order to decompose the sulfamic acid compound to heat the product at 130° C. or more and, in order to put the process into practice on an industrial scale, the product must be heated at 180° C. or more.

Figure 2:
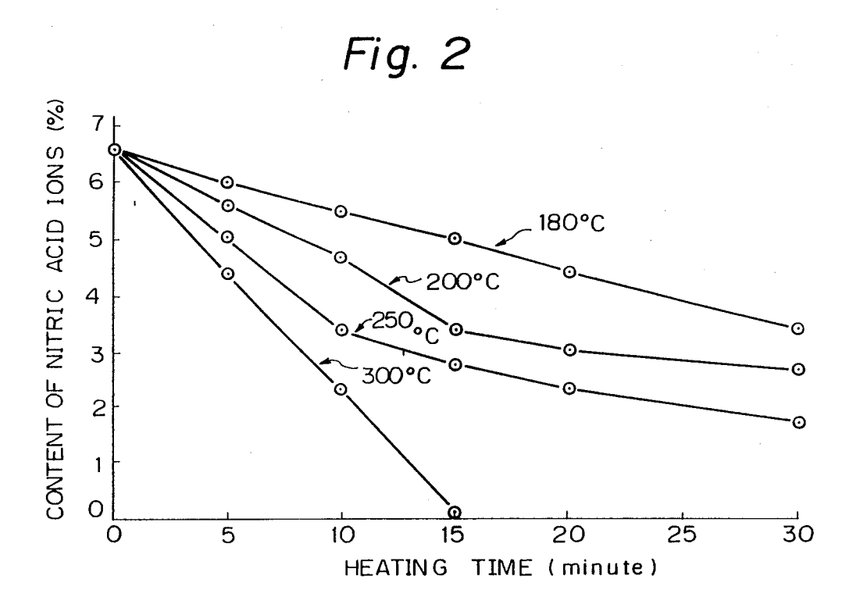
FIG. 2 is a graph showing the relationship between the heating time and the content of nitric acid ions at specific temperatures.

It will be understood from the results shown in FIG. 2 that, when the product is heated at 180° C., 200° C or 250° C., the concentration of the residual nitric acid ions is relatively high, whereas, when the heat treatment is carried out at 300° C., ammonium nitrate is decomposed at a relatively high rate and almost all the nitric acid ions are decomposed in 15 minutes. These facts show that a preferable heating temperature is about 250° C. or less, with a view to allowing as much as possible of the ammonium nitrate, which is useful as a fertilizer, to obtain.

The results shown in FIGS. 1 and 2 also show that, in any of the three cases where the product is heated for 30 minutes at 180° C., for 15 minutes at 200° C., and for 10 minutes at 250° C., respectively, both nitric acid ions and the sulfamic acid compound decrease in amounts that are substantially equimolar with each other.

Next, experiments were carried out to examine the relationship between the sulfamic acid compound and ammonium nitrate during the thermal decomposition.

EXAMPLE 3

A product in which the molar ratio of the ammonium nitrate content with respect to the content of the sulfamic acid compound was 0.1 was heated for 15 minutes at 200° C. However, there was substantially no decrease in the content of the sulfamic acid compound.

Then, four different kinds of product in which the molar ratio of the ammonium nitrate content with respect to the content of the sulfamic acid compound were 0.5, 1.0, 2.0 and 5.0 respectively prepared. These products were heated for 15 minutes at 200° C., and the content of the sulfamic acid compound in each of the heated products was measured.

Figure 3:
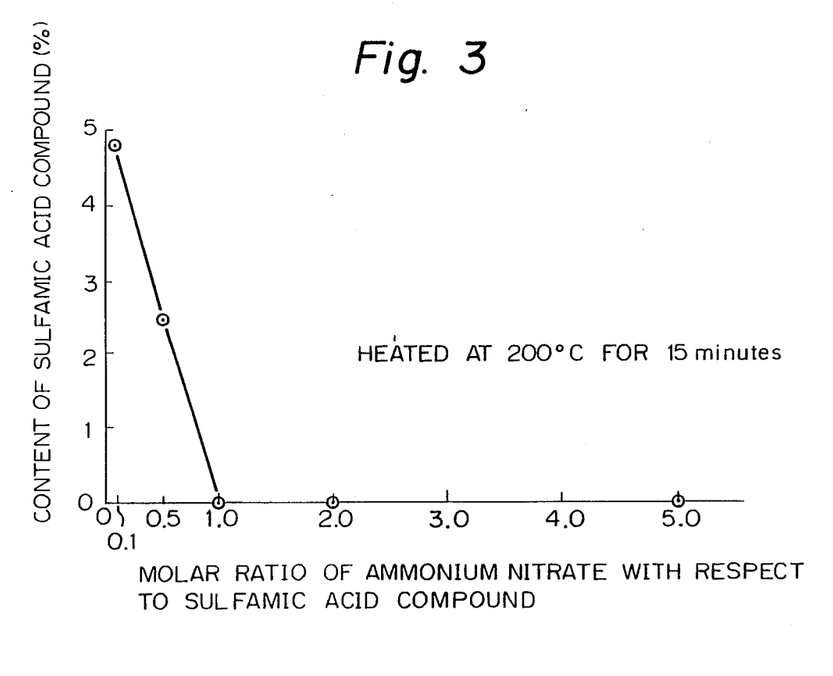
FIG. 3 is a graph showing the relationship between the content of the sulfamic acid compound in the product and the molar ratio of ammonium nitrate with respect to the sulfamic acid compound when the product is heated at 200° C. for 15 minutes.

The results are shown in FIG. 3.

The results shown in FIG. 3 revealed that ammonium nitrate is needed for the thermal decomposition of sulfamic acid compound and that 1 mole or more of ammonium nitrate is needed per mole of the sulfamic acid compound.

EXAMPLE 4

Forty grams of the product obtained in Example 1 was placed in a heating apparatus, and the heating apparatus was heated at 200° C. with a hot-air drier with helium gas being supplied thereto at a rate of 0.1 l/minute. The gas coming out of the heating apparatus was collected, and the gas generated through thermal decomposition was analyzed.

The results of the analysis are shown in Table 2.

Table 2 also shows an analysis of the gas generated when 5 kg of the product is decomposed heating, the analysis being based on the data obtained from the thermal decomposition of 40 g of the product.

TABLE 2

| | Gas generated from 40 g. of by-product | Gas generated from 5 kg. of by-product |
| --- | --- | --- |
| Nitrogen ($N_2$) | 0.562 l | 70.25 l |
| Oxygen ($O_2$) | 0.100 l | 12.50 l |
| Nitrous oxide ($N_2O$) | 0.092 l | 11.50 l |
| Ammonia ($NH_3$) | 0.029 l | 3.63 l |
| Nitrogen oxides ($NO_x$) | 0.017 l | 2.12 l |
| Total | 0.800 l | 100.00 l |

The results shown in Table 2 show that the gas generated through the thermal decomposition of the product consists essentially of nitrogen and oxygen and yet contains small amounts of $NH_3$ gas and $NO_x$ gas.

It will be understood from Table 2 that, when the product obtained at a rate of 5 kg/hour is decomposed by heating, a gas is generated at a rate of about 100 l/hour (i.e., about 0.1 m$^3$/hour), which is extremely low, i.e., about 0.01% with respect to the rate at which the effluent gas was treated in example 1, i.e., 900 Nm$^3$/hour (the product was produced at a rate of 5 kg/hour), and therefore, mixing the decomposition gas with the effluent gas to be treated will cause substantially no problem from a quantitative point of view.

By mixing the decomposition gas with the effluent gas to be treated, small amounts of $NH_3$ and $NO_x$ contained in the decomposition gas can be collected in the form of ammonium nitrate.

It is considered from the results shown in Table 2 and so on that the sulfamic acid compound contained in the product reacts with ammonium nitrate to form nitrogen, oxygen, nitrous oxide, ammonium sulfate, and water.

EXAMPLE 5

A roll crusher type granulator was heated so that the temperature of the machine from its feed opening to its compressing section was 200° C., and the dwell time of the feed in the machine was adjusted to 15 minutes. Thereafter, the by-product obtained in Example 1 was granulated this machine.

Upon analysis of the granulated product, no sulfamic acid compound was detected.

EXAMPLE 6

The product obtained in Example 1 was granulated using a moistening extrusion type granulator. The granulator was heated so that the temperature of the machine from its feed opening to its extruding section was 200° C. and the dwell time was adjusted to 15 minutes in the same way as in Example 5.

With this machine, three different kinds of product which were respectively mixed with 3%, 5% and 10% of water were granulated. Analysis of the resulting granulated products revealed that, no sulfamic acid compound was to be detected in any of the products.

The following is a description of the quantity of heat required to heat the product obtained at a rate of 5 kg/hour in Example 1 to 180° C. and the effects produced when the heat of the effluent gas at 200° C. is utilized as a heat source for heating the product.

The quantity of heat Q (kcal/hour) required to heat the product collected at a rate of 5 kg/hour from the effluent gas cooled down to 70° C. is obtained from the following equation when the temperature of the product is assumed to be 70° C.:

$$Q = 5 \text{ kg/hour} \times 0.4 \text{ kcal/kg °C.} \times (180 - 70)° \text{ C.}$$
$$= 220 \text{ kcal/hour}$$

On the other hand, a lowering in temperature ($\Delta T°$ C.) of the effluent gas caused when the heat for heating the product is collected from the effluent gas may be obtained from the following equation:

$$900 \text{ Nm}^3/\text{hour} \times 1.3 \text{ kg/Nm}^3 \times 0.25 \text{ kcal/kg° C.} \times \Delta T° \text{ C.}$$

$$= 220 \text{ kcal/hour}$$

Hence, $\Delta T = 1°$ C.

More specifically, when the product obtained at a rate of 5 kg/hour is heated to 180° C. by utilizing the effluent gas at 200° C. which is supplied at a rate of 900 Nm²/hour, the temperature of the effluent gas lowers only to 199° C. which is supplied at a rate of 900 Nm²/hour, the temperature of the effluent gas lowers only to 199° C., and it is therefore clear that there is substantially no problem.

Figure 4:
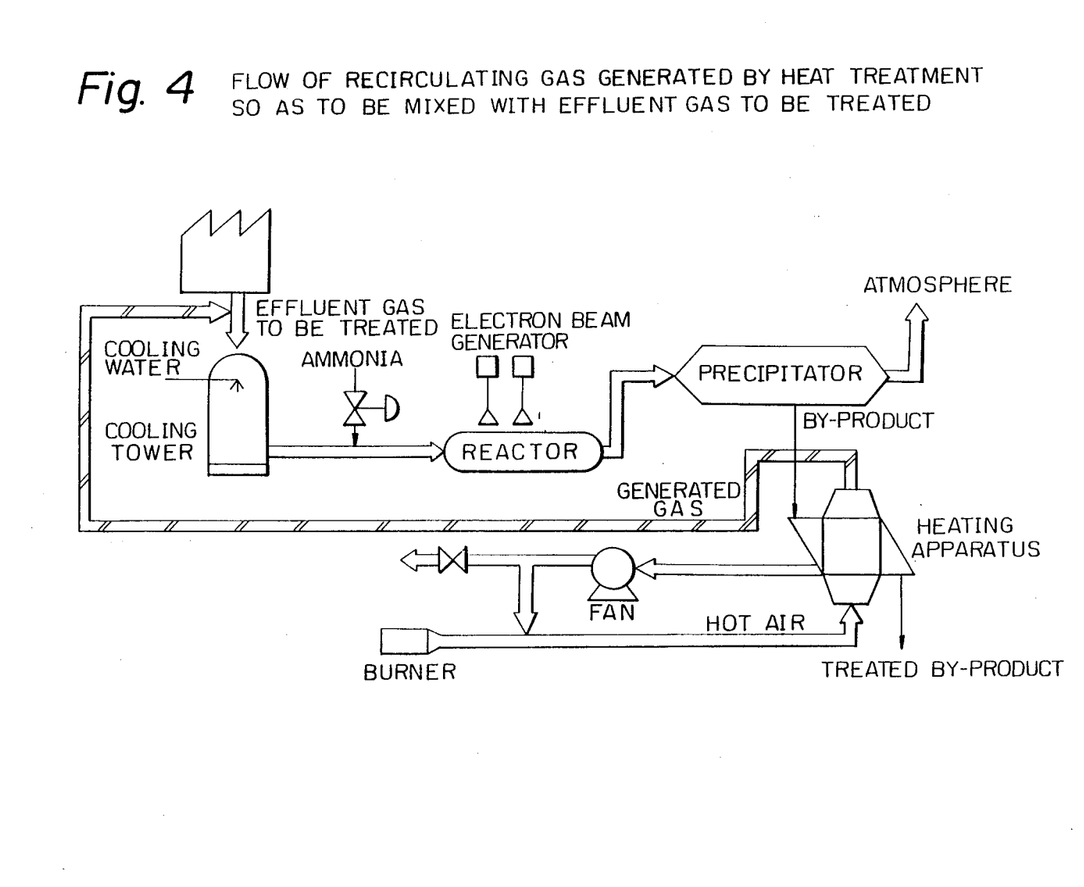
FIG. 4 shows one example of a method of recirculating the gas generated in the heat treatment so as to be mixed with the effluent gas to be treated.

FIG. 4 shows one example of a method of recirculating the decomposition gas so as to be mixed with the effluent gas which is to be treated, the method being stated in the appended claim 4.

Apparatuses for heat-treating the product may roughly be classified into two types, that is, a first type of apparatus in which the by-product is heated by bringing hot air into direct contact with the product, and a second type of apparatus in which the product is indirectly heated by utilizing heat transfer. Although either of these two types of heating apparatus may, of course, be employed in the present invention, the second type of apparatus is illustrated in the figure.

The product is supplied from a precipitator to a heating apparatus where it is heated (180 to 220° C. for 10 to 30 minutes) indirectly by means of hot air (200 to 250° C) generated by a burner. Thus, the sulfamic acid compound contained in the product is decomposed, and the product which now consists essentially of ammonium sulfate and ammonium nitrate is discharged. The gas (see Table 2) generated through the heat treatment is returned and mixed with the effluent gas which is to be treated so that the generated gas is treated again. As described above, the rate of generation of the gas is extremely low (about 0.01%) with respect to the rate of feed of the effluent gas to be treated and therefore mixing of the gas with the effluent gas will cause substantially no problem.

It should be noted that, although in the illustrated example the generated gas is returned to the duct provided at the inlet of the cooling tower, the gas may be mixed with the treated effluent gas (at the downstream side of the precipitator) because the rate of generation of the gas is sufficiently low and the contents of $NO_x$ and $NH_3$ in the generated gas are also small.

Figure 5:
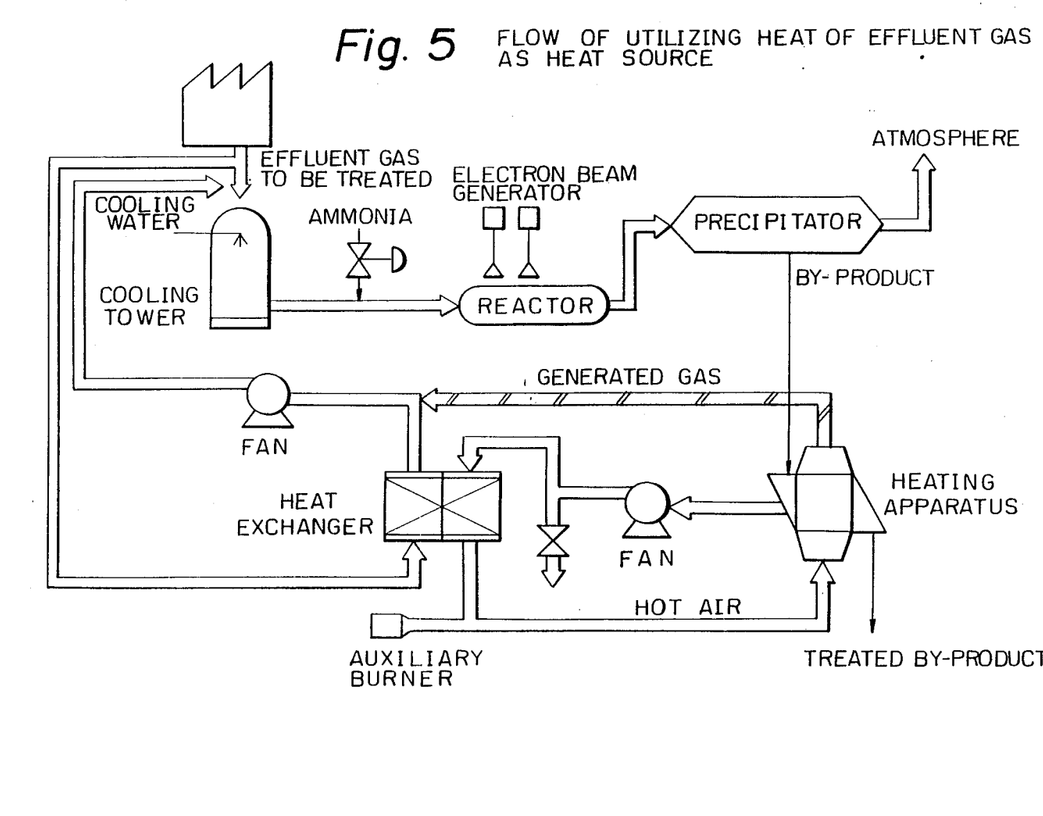
FIG. 5 shows one example of a method wherein the effluent gas which is to be treated is employed as a heat source for heating the product.

FIG. 5 shows one example of a method wherein the effluent gas which is to be treated is utilized as a heat source for heating the product, this method being recited in the appended claim 6.

The system in this example differs from the system shown in FIG. 4 in that in this system the effluent gas which is by-passed from the inlet of the cooling tower is utilized as hot air for heating the product. The arrangement of the other parts of the system is substantially the same as that in the system shown in FIG. 4. It should be noted that the illustrated auxiliary burner is employed when the temperature of the effluent gas is so low that it is impossible to obtain desired hot air.

Although in the illustrated system the by-passed effluent gas is passed through a heat exchanger so as to exchange heat with air, the effluent gas may, of course, be used directly as hot air.

EXAMPLE 7

The product obtained in Example 1 was granulated into various sizes, i.e., 0.5 mm, 1.0 mm, 3 mm, 5 mm and 10 mm, with no water added thereto. Thereafter, the granulated products were heated at the same temperatures as those in Example 2. The results of this Example were the same as those shown in FIGS. 1 and 2 for each of the different sizes.

EXAMPLE 8

The product obtained in Example 1 was mixed with water to prepare two different samples containing 20 and 30% by weight of water, respectively. Each of the samples was granulated using a pan type granulator to form granulated products having various sizes, i.e., 0.5 mm, 1.0 mm, 3 mm, 5 mm and 10 mm. These granulated products were heated at various temperatures, i.e., 100° C., 120° C., 130° C., 150° C., 180° C., 200° C. and 250° C. As a result, most of the granulated products heated at 130° C. or more burst immediately, but those which were treated at 120° C. or less did not burst even when they were heated for 10 to 20 minutes. Analysis of these granulated products revealed that there was substantially no decrease in the content of the sulfamic acid compound but water content decreased to 5–10% by weight. Thereafter, the granulated products were heated at various temperatures, i.e., 130° C., 150° C., 180° C., 200° C. and 250° C. The results were substantially the same as those shown in FIGS. 1 and 2.

What is claimed is:

1. A process for producing a fertilizer with a substantially reduced content of a sulfamic acid compound from an effluent gas comprising the steps of:
    introducing an ammonia gas into an effluent gas comprising $SO_x$, $NO_x$ and CO, the CO gas content being less than ten times the concentration of $SO_x$;
    irradiating the mixture with a radiation to form a solid product comprising ammonium sulfate and ammonium nitrate containing a sulfamic acid compound as an impurity;

heating said product at a temperature of from 130° C. to 250° C. in the presence of a molar amount of ammonium nitrate which is sufficient to reduce the amount of the sulfamic acid compound to a predetermined level equal to .01% or less with respect to 1% of the nitrogen content of the fertilizer and obtaining a fertilizer consisting substantially of ammonium sulfate and ammonium nitrate.

2. The process according to claim 1, wherein said heating temperature is selected to fall within the range from 180° C. to 250° C.

3. The process according to any one of claims 1 or 2, wherein a gas which is generated through the heat treatment of said product is recirculated so as to be mixed with the effluent gas which is to be treated.

4. The process according to any one of claims 1 or 2, wherein said heat treatment is effected in the process of granulating said by-product.

5. The process according to any one of claims 1 or 2, wherein the heat of the effluent gas is utilized as a heat source for heating said product.

6. The process according to any one of claims 1 or 2, wherein said product is granulated after being subjected to said heat treatment to decompose and remove the sulfamic acid compound.

7. The process according to any one of claims 1 or 2, wherein said product is subjected to said heat treatment after being granulated with no water added thereto.

8. The process according to any one of claims 1 or 2, wherein said product is subjected to said heat treatment after being granulated with 30% or less by weight of water added thereto.

9. The process according to claim 6 wherein the size of the granulated product is in the range of from 0.5 to 10 mm.

10. The process according to claim 8, wherein the granulated product produced with water added to said product and having a size of 0.5 to 10 mm is heat-treated in at least two stages employing different temperatures.

11. The process according to claim 10, wherein the heating temperature in the first stage is 130° C. or less and the heating temperature in the second stage is in the range of from 130° C. to 250° C.

12. The process according to any one of claims 1 or 2, wherein the radiation is electron beam from an electron beam accelerator.

13. The process according to claim 1 or 2, wherein said product contains an amount of ammonium nitrate which is 1.0 or more times the amount of the sulfamic acid compound in terms of molar ratio.

* * * * *